United States Patent
Army, Jr. et al.

(10) Patent No.: US 9,873,511 B2
(45) Date of Patent: Jan. 23, 2018

(54) PRIMARY HEAT EXCHANGER CROSSOVER BYPASS MANIFOLD

(71) Applicants: Donald E. Army, Jr., Enfield, CT (US);
Thomas M. Zywiak, Suffield, CT (US);
David Anderson, Jr., Enfield, CT (US)

(72) Inventors: Donald E. Army, Jr., Enfield, CT (US);
Thomas M. Zywiak, Suffield, CT (US);
David Anderson, Jr., Enfield, CT (US)

(73) Assignee: HAMILTON SUNDSTRAND CORPORATION, Windsor Locks, CT (US)

(*) Notice: Subject to any disclaimer, the term of this patent is extended or adjusted under 35 U.S.C. 154(b) by 937 days.

(21) Appl. No.: 13/625,452

(22) Filed: Sep. 24, 2012

(65) Prior Publication Data

US 2014/0083647 A1   Mar. 27, 2014

(51) Int. Cl.
*B64D 13/08*   (2006.01)
*B64D 13/00*   (2006.01)
*B64D 13/06*   (2006.01)

(52) U.S. Cl.
CPC ............ *B64D 13/00* (2013.01); *B64D 13/06* (2013.01); *B64D 2013/0603* (2013.01)

(58) Field of Classification Search
CPC ...................................................... B64B 13/00
USPC ............................................ 454/71, 76, 72
See application file for complete search history.

(56) References Cited

U.S. PATENT DOCUMENTS

| | | | | |
|---|---|---|---|---|
| 2,734,443 | A * | 2/1956 | Wood | B64D 13/04 165/235 |
| 4,503,666 | A * | 3/1985 | Christoff | B64D 13/06 60/39.183 |
| 4,681,133 | A * | 7/1987 | Weston | 137/315.18 |
| 4,979,363 | A * | 12/1990 | Hitchcock et al. | 60/226.3 |
| 5,461,882 | A * | 10/1995 | Zywiak | B60H 1/00007 62/401 |
| 5,511,385 | A * | 4/1996 | Drew et al. | 62/172 |
| 5,690,135 | A * | 11/1997 | Dehais | 137/79 |
| 6,139,423 | A * | 10/2000 | Wadey | 454/142 |
| 6,375,849 | B1 * | 4/2002 | Crabtree | B64D 13/08 210/195.2 |
| 6,568,203 | B1 * | 5/2003 | Leathers | B64F 1/362 62/172 |
| 8,087,255 | B2 * | 1/2012 | Klimpel | B64D 13/06 62/244 |
| 8,206,088 | B1 * | 6/2012 | Plattner | B64D 13/06 415/143 |

(Continued)

*Primary Examiner* — Gregory Huson
*Assistant Examiner* — Martha Becton
(74) *Attorney, Agent, or Firm* — Cantor Colburn LLP

(57) ABSTRACT

An aircraft is provided including an environmental control system (ECS) having a first ECS pack and a second ECS pack. A duct couples the first ECS pack to the second ECS pack. The duct includes a first bypass conduit configured to form a bypass around a first primary heat exchanger of the first ECS pack. A second bypass conduit configured to form a bypass around a second primary heat exchanger of the second ECS pack. The duct includes a crossover conduit extending between the first bypass conduit and the second bypass conduit. The duct includes a plurality of valves for selectively controlling a flow between the first bypass conduit and the second bypass conduit.

14 Claims, 6 Drawing Sheets

(56) References Cited

U.S. PATENT DOCUMENTS

| | | | | |
|---|---|---|---|---|
| 2002/0121103 A1* | 9/2002 | Udobot | ............... | B64D 13/06 |
| | | | | 62/402 |
| 2009/0321062 A1* | 12/2009 | Ebigt | ............... | B64D 13/06 |
| | | | | 165/276 |
| 2013/0277009 A1* | 10/2013 | Army | ............... | B64D 13/06 |
| | | | | 165/41 |
| 2013/0318983 A1* | 12/2013 | Zhou | ............... | F02C 6/08 |
| | | | | 60/772 |
| 2014/0260340 A1* | 9/2014 | Vaisman | ............... | B64D 13/08 |
| | | | | 62/56 |

* cited by examiner

US 9,873,511 B2

PRIMARY HEAT EXCHANGER CROSSOVER BYPASS MANIFOLD

BACKGROUND OF THE INVENTION

Exemplary embodiments of this invention generally relate to environmental control systems of an aircraft and, more particularly, to operation of an environment control system while an aircraft is on the ground or in particular flight configurations.

Commercial jet aircrafts typically include environmental control systems (ECS) that regulate air supply, temperature, and cabin pressurization on the aircraft. Such an ECS may also be utilized to provide cooling to components of the aircraft itself, such as electrical systems. The ECS of most jet aircrafts typically includes two or more ECS packs which provide pressurized air of an appropriate temperature to the cabin of the aircraft. The ECS can utilize heated, pressurized bleed air or electrically driven cabin air compressors powered by the engine or auxiliary power unit of the aircraft. Ambient ram air that enters the aircraft through a ram scoop is typically used as the system heat sink.

When an aircraft is on the ground and its main engines are not being used, an alternative power source, such as an auxiliary power unit for example, may be used to supply power to support ground operations. During some ground operations, the ECS may continue to supply temperature controlled air to the cabin and onboard aircraft equipment. The alternative power source used to provide power when the aircraft is on the ground is limited and may not provide enough power to the aircraft to operate the entire ECS. For example, in an aircraft having an ECS that includes multiple air conditioning or ECS packs, the power provided may support only one of the ECS packs, rather than all of them.

BRIEF DESCRIPTION OF THE INVENTION

According to one embodiment of the invention, a duct for coupling a left hand side environmental control system pack and a right hand side environmental control system pack of an aircraft is provided including a first bypass conduit positioned adjacent a first end. A second bypass conduit is positioned adjacent a second, opposite end. A crossover conduit extends between the first bypass conduit and the second bypass conduit. The duct includes a plurality of valves for selectively controlling a flow between the first bypass conduit and the second bypass conduit.

According to an alternate embodiment of the invention, an aircraft is provided including an environmental control system (ECS) having a first ECS pack and a second ECS pack. A duct couples the first ECS pack to the second ECS pack. The duct includes a first bypass conduit configured to form a bypass around a first primary heat exchanger of the first ECS pack. A second bypass conduit configured to form a bypass around a second primary heat exchanger of the second ECS pack. The duct includes a crossover conduit extending between the first bypass conduit and the second bypass conduit. The duct includes a plurality of valves for selectively controlling a flow between the first bypass conduit and the second bypass conduit.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
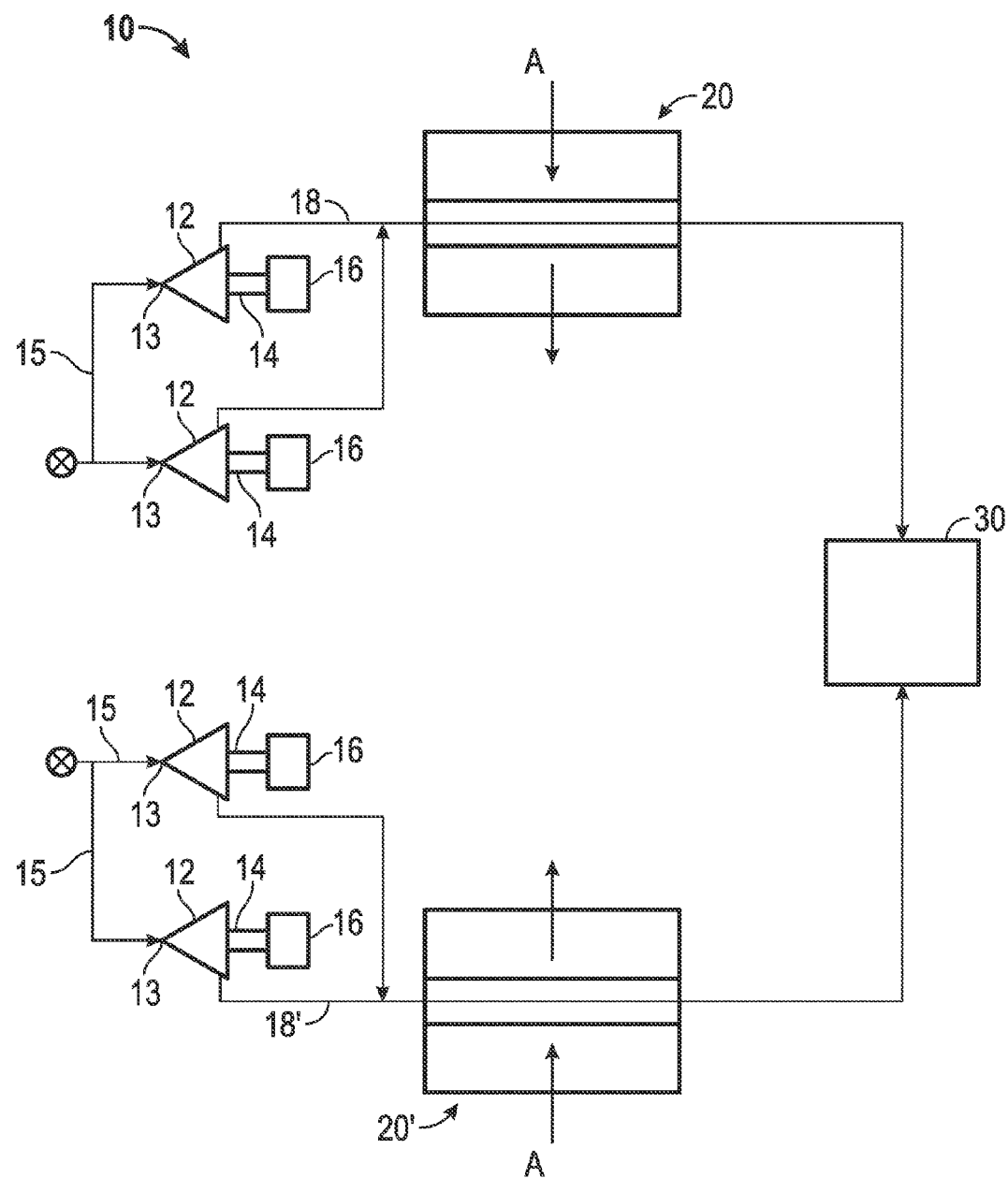
FIG. 1 is a schematic diagram of a conventional environmental control system (ECS) in an aircraft.

A schematic diagram of a pertinent portion of an environmental control system (ECS) 10 for an aircraft is illustrated in FIG. 1. Environmental control systems (ECS) 10 for aircrafts and other vehicles are utilized to provide a conditioned airflow for passengers and crew within the fuselage of the vehicle. An ECS 10 typically includes a multitude of various components which are packaged relatively close together to define an ECS pack 20. The ECS pack 20 is typically located under the wing at the center (in the fore/aft direction) of the aircraft. The ECS 10 also includes at least one cabin air compressor (CAC) 12 positioned upstream from the ECS pack 20. The term "upstream" as used herein with respect to a component or location shall refer to location that is closer to a source of an airflow than another location.

Each CAC 12 is driven by a motor 16 connected to the CAC 12 via a shaft 14. Outside airflow 15, flows into each CAC 12 at a compressor inlet 13. It shall be understood that the outside airflow 15 could be received from any location outside of the ECS 10, including, for example, from any other system on the aircraft. The CACs 12 are configured to raise the pressure of the airflow 15 to a level that is slightly above the desired aircraft cabin pressure.

Because air compression generates heat, the air from the CACs 12 is then supplied through a conduit 18 to the ECS pack 20. The components of the ECS pack 20 provide an air cycle refrigeration system that utilizes ambient ram air A as a refrigerant through a primary heat exchanger 22 (see FIG. 2), a secondary heat exchanger (not shown), and an air cycle machine (not shown). After the compressed air passes through the air cycle machine, the air, which has a desired temperature, may be vented into a destination 30 that may be, for example, the cabin of the aircraft or to electronic equipment of the aircraft.

The aircraft ECS 10 may include multiple ECS packs 20 as illustrated. In one embodiment, a first ECS pack 20 is disposed adjacent a right hand side of the aircraft, and a second substantially identical ECS pack 20' is disposed adjacent a left hand side of the aircraft. Because the ECS packs 20, 20' are disposed on opposite sides of a keel beam 35 (see FIGS. 2, 4, and 5) of the aircraft, separate CACs 12 are configured for use with each respective ECS pack 20, 20' of the system. The plurality of ECS packs 20, 20' may additionally be powered by one or more auxiliary power units (APUs) when the aircraft is on the ground. The APUs may include separate gas turbine engines that do not provide propulsion to the aircraft, but may in part power the ECS packs 20, 20', as well as other equipment of the aircraft.

Figure 2:
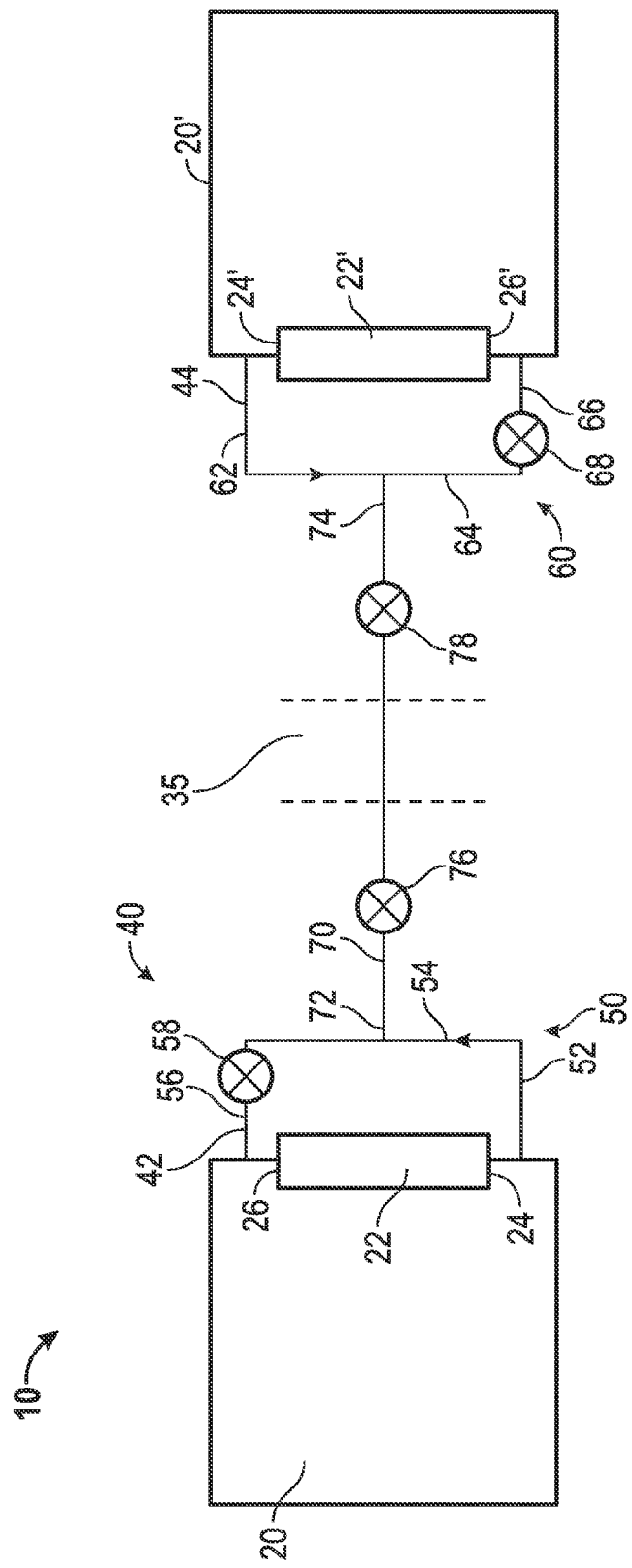
FIG. 2 is a schematic diagram of a duct coupling multiple ECS packs according to an embodiment of the invention.
Figure 3:
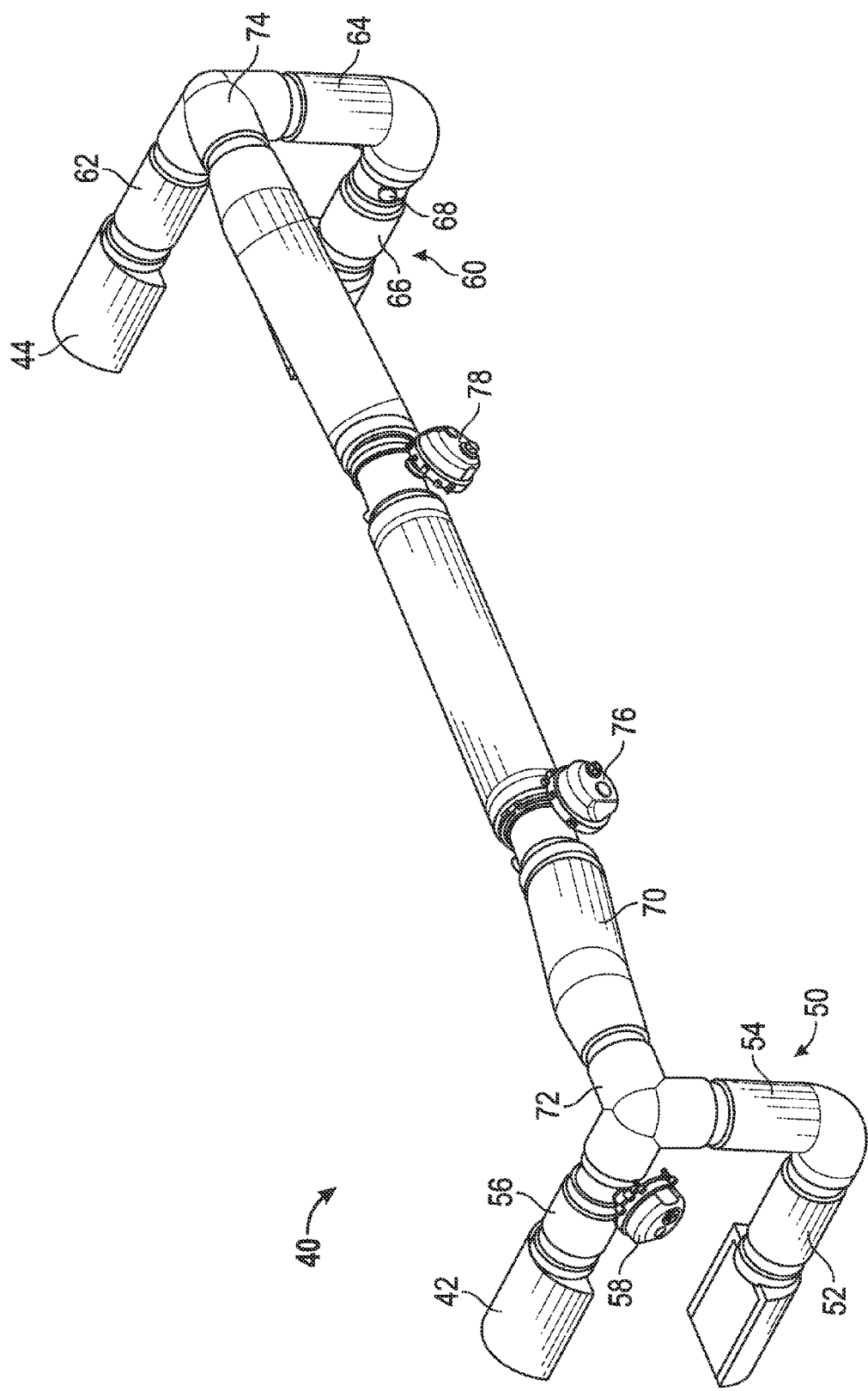
FIG. 3 is a perspective view of the duct illustrated in FIG. 2.

Referring now to FIGS. 2 and 3, a duct 40 for coupling the compressed air flow between multiple ECS packs 20, 20' is illustrated. The duct 40 includes a first bypass conduit 50 disposed at a first end 42. The first bypass conduit 50 has a first inlet arm 52 and a first outlet arm 56, substantially equal in length, and a first base 54 connecting the two arms 52, 56, such that the first bypass conduit 50 is generally U-shaped. The first bypass conduit 50 includes a first bypass valve 58. In one embodiment, the first bypass valve 58 is disposed on the outlet arm 56 and is configured to connect to a first ECS pack 20, such as the left hand side ECS pack for example, adjacent a primary heat exchanger outlet 26.

The duct 40 similarly includes a second bypass conduit 60 adjacent to a second end 44. The second bypass conduit 60 has a second inlet arm 62 and a second outlet arm 66 connected by a base 64 to form a general U-shape. The second inlet arm 62 and the second outlet arm 66 of the second bypass conduit 60 are substantially equal in length. In one embodiment, the arms 52, 56 of the first bypass conduit 50 and the arms 62, 66 of the second bypass conduit 60 are generally equal in length. The first outlet arm 56 and the second inlet arm 62 may be arranged within a first plane and the first inlet arm 52 and the second outlet arm 66 may be arranged within a second plane, parallel to the first plane, such that the U-shape formed by each conduit is substantially equal in size and are generally aligned. The second bypass conduit 60 includes a second bypass valve 68. In one embodiment, the second bypass valve 68 is located on the second outlet arm 66 of the second bypass conduit 60 which is configured to couple to a second ECS pack 20', such as the right hand side ECS pack for example, adjacent the outlet 26' of the primary heat exchanger 22'.

A generally linear crossover conduit 70 couples the first bypass conduit 50 and the second bypass conduit 60. In one embodiment, the first end 72 of the crossover conduit 70 connects to the first bypass conduit 70 at the intersection between the base 54 and the first outlet arm 56 and the second end 74 of the crossover conduit 70 connects to the second bypass conduit 60 at the intersection between the base 64 and the second inlet arm 62. Alternatively, the crossover conduit 70 may connect to the first bypass conduit 50 and the second bypass conduit 60 at the intersection between the base 54, 64 and the first inlet arm 52 and the second outlet arm 62 respectively. The crossover conduit 70 includes a first crossover valve 76 and a second crossover valve 78 spaced apart by a distance. In one embodiment, the first cross over valve 76 and the second crossover valve 78 are positioned adjacent opposing sides of a central keel beam 35 illustrated by a dotted line. The plurality of valves including the bypass valves 58, 68 and the crossover valves 76, 78 may all be the same type of valve. The valves used in the duct are simple valves configured to move between an open position and a closed position. Exemplary valves include but are not limited to ball valves, disc valves, and gate valves for example.

The first outlet arm 56 of the first bypass conduit 50 is configured to connect to a first ECS pack 20 adjacent an outlet 26 of a primary heat exchanger 22, and the first inlet arm 52 of the first bypass conduit 50 is configured to connect to the first ECS pack 20 adjacent the inlet 24 of the primary heat exchanger 22. Similarly, the second inlet arm 62 of the second bypass conduit 60 is configured to connect to a second ECS pack 20' adjacent an inlet 24' of the primary heat exchanger 22', and a second outlet arm 66 of the second bypass conduit 60 is configured to connect to the second ECS pack 20' adjacent the outlet 26' of the primary heat exchanger 22'. If either bypass valve 58, 68 is open, the bypass conduit 50, 60 having an open bypass valve 58, 68 forms a flow path such that a portion of the high temperature compressed air flows around the primary heat exchanger 22, 22' and back into the cooler compressed air stream that is exhausted from the primary heat exchanger 22, 22'.

The crossover conduit 70 extends through a pair of holes in the keel 35 to connect the pair of bypass conduits 50, 60. When both of the crossover valves 76, 78 are closed and the bypass valves 58, 68 are open, any compressed air flowing into the first and second bypass conduits 50, 60 circumvents the primary heat exchanger 22, 22' of each respective ECS pack 20, 20', but is not transferred to the other ECS pack 20, 20'. When the bypass valves 58, 68 are open and both of the crossover valves 76, 78 are open, some compressed air from both of the ECS packs 20, 20' flows through the crossover conduit 70 to the other ECS pack 20, 20'. By allowing the compressed air to flow between the coupled ECS packs 20, 20', the flow generated by both of the ECS packs 20, 20' is shared to improve the overall system efficiency. Because the bypass valves 58, 68 are positioned along the outlet arm 56, 66 of the bypass conduits, in instances where the bypass valves 58, 68 are closed but the crossover valves 76, 78 are open, compressed air from each ECS pack 20, 20' may enter the inlet arm 52, 62 of each bypass conduit and flow through the crossover conduit 70 to the other ECS pack 20, 20'.

Figure 4:
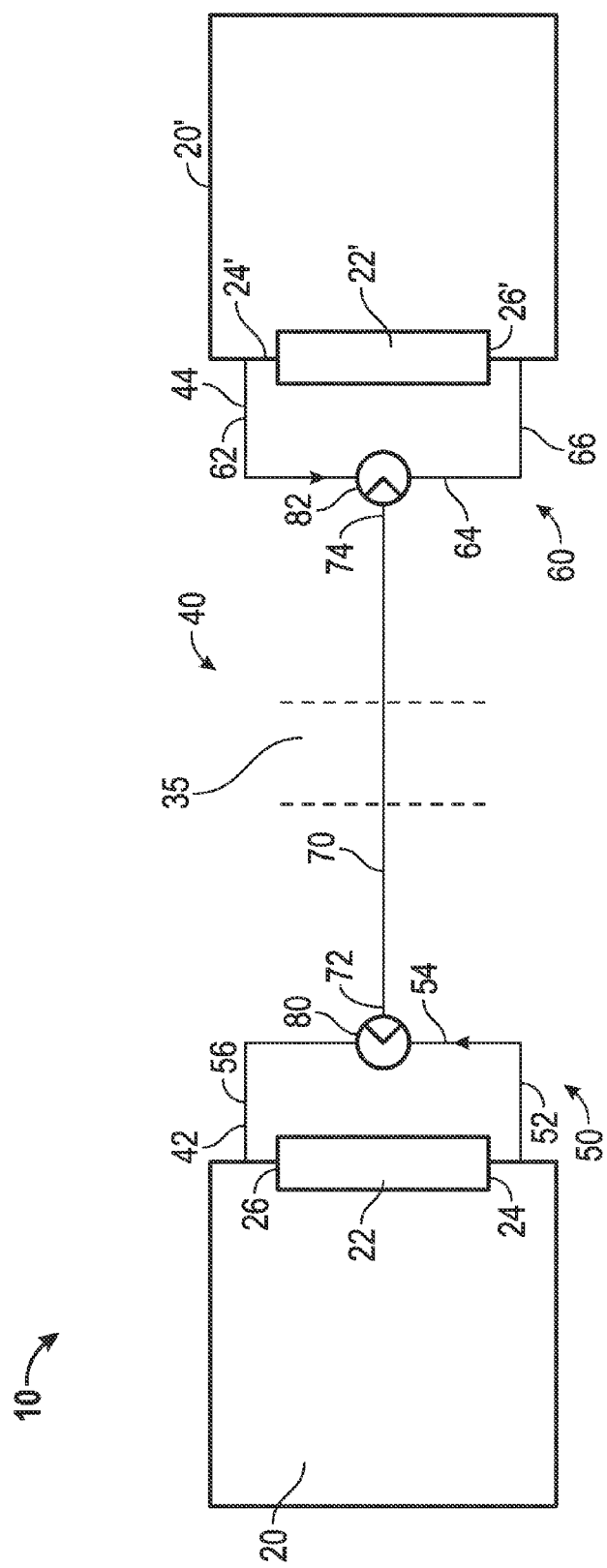
FIG. 4 is a schematic diagram of a duct coupling multiple ECS packs according to another embodiment of the invention.
Figure 5:
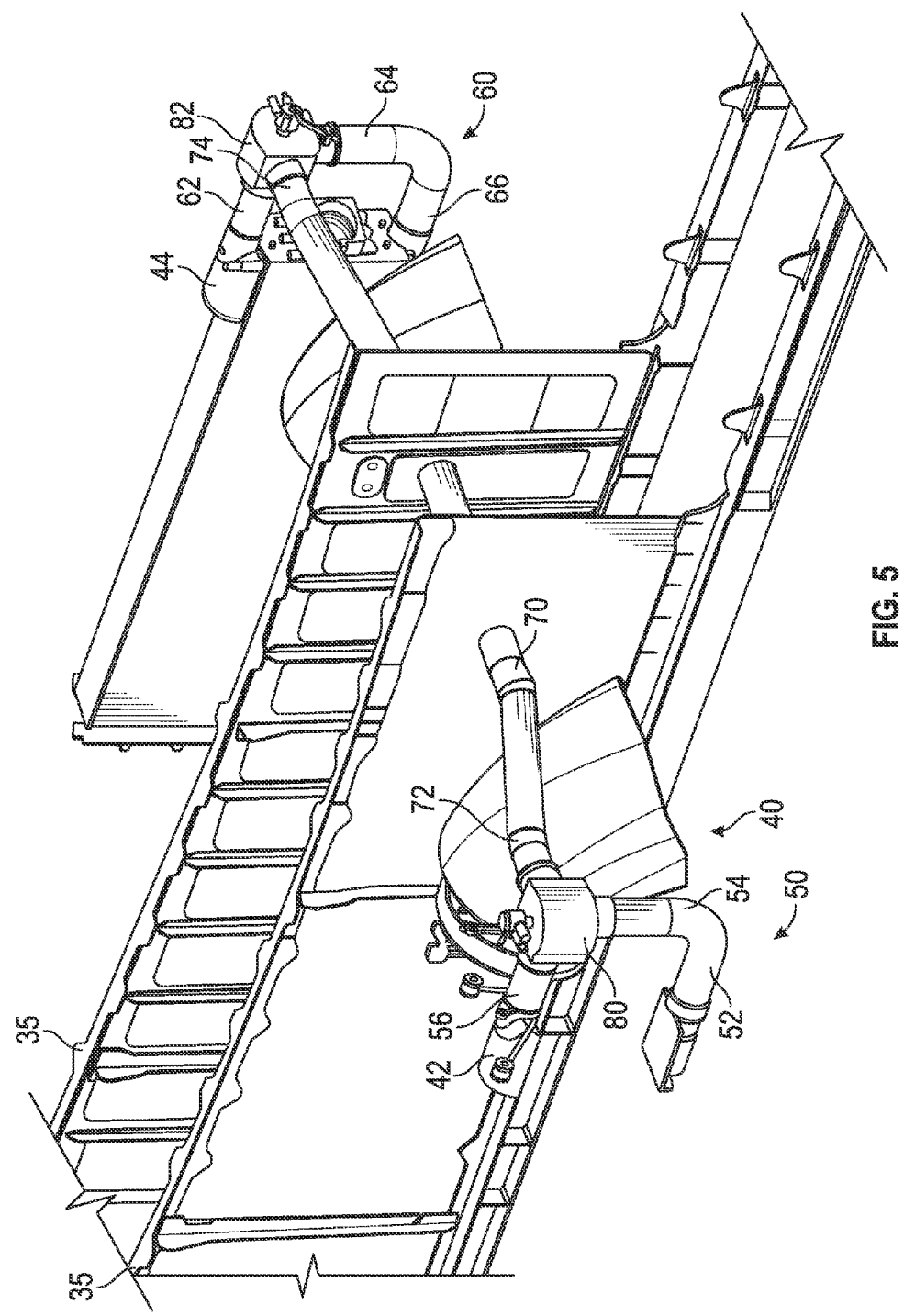
FIG. 5 is a perspective view of a portion of an ECS including the duct illustrated in FIG. 4.
Figure 6:
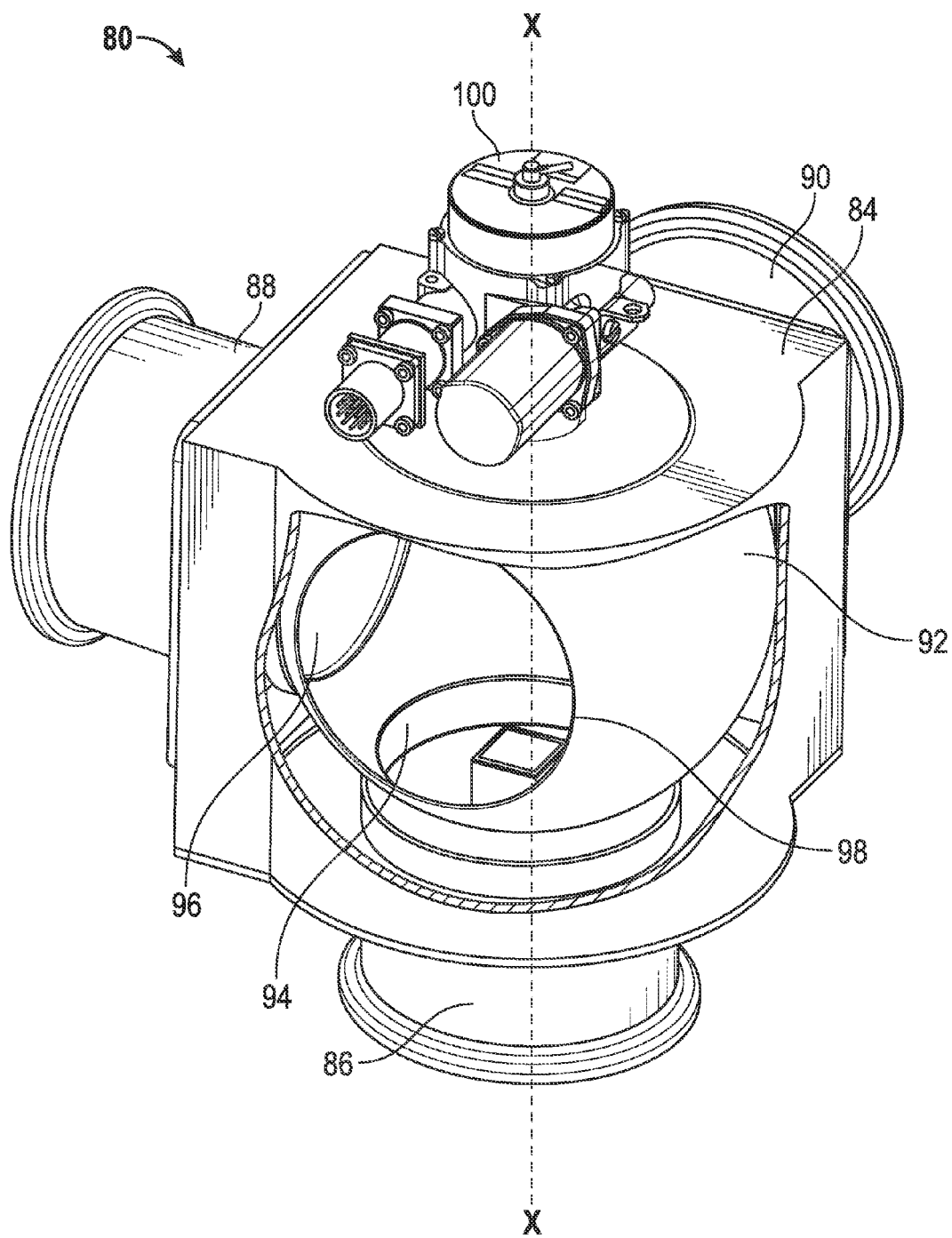
FIG. 6 is a partial cut away view of an exemplary diverter valve as illustrated in FIG. 5.

In another embodiment, illustrated in FIGS. 4-6, the functionality of the first crossover valve 76 and the second crossover valve 78 is integrated with the first bypass valve 58 and the second bypass 68 valve respectively. In one embodiment, a first diverter valve 80 is positioned at the intersection of the first bypass conduit 50 and the crossover conduit 70 and a second diverter valve 82 is positioned at the intersection of the second bypass conduit 60 and the crossover conduit 70. The first diverter valve 80 and the second diverter valve 82 are substantially identical.

An exemplary diverter valve 80, illustrated in more detail in FIG. 6, includes a housing 84 having a plurality of openings for connecting to multiple conduits. The openings may be arranged perpendicularly to one another. In one embodiment, an inlet arm of a bypass conduit, such as inlet arm 52 for example connects to a first opening 86, and the outlet arm of a bypass conduit, such as outlet arm 56 for example, connects to a second opening 88. The inlet arm or the outlet arm may be coupled to the valve 80 through the base. An end of the crossover conduit 70, such as first end 72 for example, connects to the third opening 90 of the diverter valve 80. Inside the three-way diverter valve 80 is a ball 92 rotatable about an axis X. Because the valve 80 is a three-way diverter valve, the ball 92 includes three holes 94, 96, 98 that selectively align with the coupled conduits to allow flow through the valve 80 in a desired direction. An actuator 100 is configured to rotate the ball 92 through an angle of about 270 degrees such that compressed air entering the valve 80 may flow through either the bypass conduit or the crossover conduit, both the bypass conduit and the crossover conduit, or neither the bypass conduit nor the crossover conduit.

When an aircraft is on the ground, generators connected to the aircraft can only supply a set amount of power, which may not be enough to operate all of the cabin air compressors 12 of an aircraft. By coupling the compressed air flow between multiple ECS packs 20, 20' in an environmental control system 10 of an aircraft using duct 40, the flow generated by the ECS packs 20, 20' is shared equally, thereby improving the efficiency of the ECS, which in turn improves the heating and cooling performance of the aircraft.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A duct for coupling a left hand side environmental control system pack and a right hand side environmental control system pack of an aircraft, comprising:
    a first bypass conduit operably coupled to the left hand side environmental control system pack both upstream and downstream of a primary heat exchanger of the left hand side environmental control system pack, a first bypass valve disposed at the first bypass conduit to selectably direct airflow through the first bypass conduit or through the primary heat exchanger of the left hand side environmental control system pack;
    a second bypass conduit operably coupled to the right hand side environmental control system pack both upstream and downstream of a primary heat exchanger of the right hand side environmental control system pack, a second bypass valve disposed at the second bypass conduit to selectably direct airflow through the second bypass conduit or through the primary heat exchanger of the right hand side environmental control system pack;
    a crossover conduit extending between the first bypass conduit and the second bypass conduit; and
    one or more crossover valves for selectively controlling a flow between the first bypass conduit and the second bypass conduit, wherein the one or more crossover valves may be operated to allow a flow through the crossover conduit but not through an outlet of at least one of the first bypass conduit and the second bypass conduit; the first bypass conduit connected to the second bypass conduit only via the crossover conduit.

2. The duct according to claim 1, wherein the first bypass conduit includes a first inlet arm and a first outlet arm connected by a first base, and the second bypass conduit includes a second inlet arm and a second outlet arm connected by a second base.

3. The duct according to claim 2, wherein the one or more crossover valves are moveable between an open position and a closed position.

4. The duct according to claim 2, wherein the first bypass valve is positioned along the first outlet arm, and the second bypass valve is positioned along the second outlet arm.

5. The duct according to claim 2, wherein the each of the one or more crossover valves is a diverter valve movable 270 degrees between a plurality of positions.

6. The duct according to claim 1, further comprising a first diverter valve positioned at an intersection between a first end of the crossover conduit and the first bypass conduit, and a second diverter valve positioned at an intersection between a second end of the crossover conduit and the second bypass conduit.

7. The duct according to claim 6, wherein in a first position, the first diverter valve allows flow through both the first bypass conduit and the crossover conduit, in a second position, the first diverter valve allows flow through only the first bypass conduit, in a third position the first diverter valve allows flow through only the crossover conduit, and in a fourth position, the first diverter valve doesn't allow flow through either the first bypass conduit or the crossover conduit.

8. An aircraft comprising:
    an environmental control system having a first environmental control system (ECS) pack and a second ECS pack;
    a duct coupling the first ECS pack and the second ECS pack, the duct including:
        a first bypass conduit operably coupled to the first ECS pack both upstream and downstream of a primary heat exchanger of the first ECS pack, a first bypass valve disposed at the first bypass conduit to selectably direct airflow through the first bypass conduit or through the primary heat exchanger of the left hand side environmental control system pack;
        a second bypass conduit operably coupled to the second ECS pack both upstream and downstream of a primary heat exchanger of the second ECS pack, a second bypass valve disposed at the second bypass conduit to selectably direct airflow through the second bypass conduit or through the primary heat exchanger of the right hand side environmental control system pack;
        a crossover conduit extending between the first bypass conduit and the second bypass conduit; and
        one or more crossover valves for selectively controlling a flow of a fluid between the first bypass conduit and the second bypass conduit, wherein the one or more crossover valves may be operated to allow a flow through the crossover conduit but not through an outlet of at least one of the first bypass conduit and the second bypass conduit; the first bypass conduit connected to the second bypass conduit only via the crossover conduit.

9. The aircraft according to claim 8, wherein the first bypass conduit includes a first inlet arm and a first outlet arm connected by a first base, and the second bypass conduit includes a second inlet arm and a second outlet arm connected by a second base.

10. The aircraft according to claim 9, wherein the first inlet arm is connected adjacent an inlet of the first primary heat exchanger and the first outlet arm is connected adjacent an outlet of the first primary heat exchanger, and the second inlet arm is connected adjacent an inlet of the second primary heat exchanger and the second outlet arm is connected adjacent an outlet of the second primary heat exchanger.

11. The aircraft according to claim 9, wherein the one or more crossover valves are moveable between an open position and a closed position.

12. The aircraft according to claim 9, wherein the first bypass valve is positioned along the first outlet arm, and the second bypass valve is positioned along the second outlet arm.

13. The aircraft according to claim 9, wherein the each of the one or more crossover valves is a diverter valve movable 270 degrees between a plurality of positions.

14. The aircraft according to claim 8, further comprising a first diverter valve positioned at an intersection between a first end of the crossover conduit and the first bypass conduit, and a second diverter valve positioned at an intersection between a second end of the crossover conduit and the second bypass conduit.

\* \* \* \* \*